US009365199B2

(12) United States Patent
Drumm

(10) Patent No.: US 9,365,199 B2
(45) Date of Patent: Jun. 14, 2016

(54) METHOD FOR OPERATING A BRAKE SYSTEM AND A BRAKE SYSTEM

(71) Applicant: Continental Teves AG & Co. oHG, Frankfurt (DE)

(72) Inventor: Stefan A. Drumm, Saulheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/380,970

(22) PCT Filed: Feb. 14, 2013

(86) PCT No.: PCT/EP2013/052977
§ 371 (c)(1),
(2) Date: Aug. 26, 2014

(87) PCT Pub. No.: WO2013/127639
PCT Pub. Date: Sep. 6, 2013

(65) Prior Publication Data
US 2015/0035353 A1 Feb. 5, 2015

(30) Foreign Application Priority Data

Feb. 28, 2012 (DE) .......................... 10 2012 203 013
Dec. 12, 2012 (DE) .......................... 10 2012 222 897

(51) Int. Cl.
*B60T 8/36* (2006.01)
*B60T 15/02* (2006.01)
(Continued)

(52) U.S. Cl.
CPC ............... *B60T 15/028* (2013.01); *B60T 7/042* (2013.01); *B60T 8/3655* (2013.01); *B60T 8/4063* (2013.01);
(Continued)

(58) Field of Classification Search
CPC ..... B60T 8/4081; B60T 8/3655; B60T 8/366; B60T 8/367; B60T 7/042; B60T 13/686
USPC .............. 303/189, 113.3, 115.2, 116.1, 119.1
See application file for complete search history.

(56) References Cited

U.S. PATENT DOCUMENTS 6,851,764 B2 * 2/2005 Giers ........................ B60T 8/36
303/115.2
6,976,741 B2 * 12/2005 Hara ................... B60T 8/17616
303/113.1
(Continued)

FOREIGN PATENT DOCUMENTS

DE 3801505 7/1989
DE 4029793 3/1992
(Continued)

OTHER PUBLICATIONS

German Search Report mailed Sep. 5, 2013 in counterpart German Application No. 10 2012 222 897.7.
(Continued)

*Primary Examiner* — Thomas Irvin
(74) *Attorney, Agent, or Firm* — RatnerPrestia

(57) ABSTRACT

A method and system for operating a motor vehicle brake system, actuated in a "Brake-by-Wire" operating mode both by the vehicle driver and also independent of the vehicle driver, preferably operated in the "Brake-by-Wire" operating mode, and which can be operated in at least one fall-back operating mode, in which only operation by the vehicle driver is possible. The brake system has an electrohydraulic pressure and volume setting device, which electronically emits a brake system pressure under control, and a pressure modulation unit having, for each wheel brake, inlet and outlet valves for setting wheel-specific brake pressures. For setting wheel-specific brake pressures, the inlet and outlet valves are actuated analogously by being energized by different electrical currents, in order to assign a pressurizing agent volume flow provided by the pressure and volume setting device to the wheel brakes that have a pressure change requirement.

19 Claims, 2 Drawing Sheets

(51) Int. Cl.
*B60T 8/40* (2006.01)
*B60T 7/04* (2006.01)
*B60T 11/10* (2006.01)
*B60T 11/28* (2006.01)
*B60T 13/68* (2006.01)

(52) U.S. Cl.
CPC ............ *B60T 8/4081* (2013.01); *B60T 11/103* (2013.01); *B60T 11/28* (2013.01); *B60T 8/366* (2013.01); *B60T 8/367* (2013.01); *B60T 13/686* (2013.01)

(56) References Cited

U.S. PATENT DOCUMENTS

| | | | | |
|---|---|---|---|---|
| 7,481,500 | B2* | 1/2009 | Miyazaki | B60T 8/367 303/113.1 |
| 7,673,948 | B2* | 3/2010 | Otomo | B60T 8/24 188/358 |
| 7,722,133 | B2* | 5/2010 | Suzuki | B60T 8/367 303/10 |
| 8,366,207 | B2* | 2/2013 | Hironaka | B60T 7/042 303/116.1 |
| 9,145,119 | B2* | 9/2015 | Biller | B60T 8/4081 |
| 9,205,821 | B2* | 12/2015 | Biller | B60T 8/4081 |
| 2012/0029785 | A1 | 2/2012 | Loos | |
| 2012/0169112 | A1 | 7/2012 | Jungbecker | |
| 2013/0207452 | A1 | 8/2013 | Gilles | |
| 2014/0152085 | A1* | 6/2014 | Biller | B60T 8/4081 303/10 |
| 2014/0203626 | A1* | 7/2014 | Biller | B60T 8/4081 303/10 |
| 2014/0225425 | A1* | 8/2014 | Drumm | B60T 7/042 303/9.75 |
| 2014/0368027 | A1* | 12/2014 | Bohm | B60T 8/4081 303/14 |

FOREIGN PATENT DOCUMENTS

| | | |
|---|---|---|
| DE | 19543582 | 5/1997 |
| DE | 10065347 | 7/2001 |
| DE | 102010040097 | 3/2011 |
| DE | 102011084206 | 4/2012 |
| EP | 2353950 | 8/2011 |
| WO | 9939954 | 8/1999 |
| WO | 2011141158 | 11/2011 |

OTHER PUBLICATIONS

International Search Report and Written Opinion for PCT/EP2013/052977 mailed Apr. 11, 2013.

* cited by examiner

METHOD FOR OPERATING A BRAKE SYSTEM AND A BRAKE SYSTEM

CROSS REFERENCE TO RELATED APPLICATIONS

This application is the U.S. National Phase Application of PCT/EP2013/052977, filed Feb. 14, 2013, which claims priority to German Patent Application Nos. 10 2012 203 013.1, filed Feb. 28, 2012 and 10 2012 222 897.7, filed Dec. 12, 2012, the contents of such applications being incorporated by reference herein.

FIELD OF THE INVENTION

A method for operating a brake system for motor vehicles, which can be controlled in a "brake-by-wire" operating mode both by the vehicle driver and also independently of the vehicle driver, is preferably operated in the "brake-by-wire" operating mode, and can be operated in at least one fall-back operating mode, with
  hydraulic wheel brakes
  a brake master cylinder having at least one pressure space, with the pressure in which at least the wheel brakes of a front axle of the motor vehicle, in particular all the wheel brakes, can be supplied in the fall-back operating mode,
  a pressure medium reservoir,
  a brake pedal for actuating the brake master cylinder,
  brake circuits, which have brake master cylinder and wheel brake pressure spaces, hydraulic connections and electrohydraulic control elements,
  an electrically actuable isolating valve for each brake circuit for dividing the brake circuit into a brake circuit section which can be subjected to pressure by the vehicle driver and a brake circuit section which can be subjected to pressure "by wire",
  an electrically actuable inlet valve and an electrically actuable outlet valve for each wheel brake for setting wheel-specific brake pressures,
  an electrically controllable pressure and volume setting device,
  an electrically actuable connection valve, in particular a valve of this kind which is closed when deenergized, for each brake circuit for hydraulic connection of the pressure and volume setting device to the brake circuit section which can be subjected to pressure "by wire",
  a simulation device, which can be connected hydraulically to at least one pressure space of the brake master cylinder and can be activated by means of an electrically or mechanically actuable simulator enable valve, having a preset characteristic, and which gives the vehicle driver a pleasant brake pedal feel in the "brake-by-wire" operating mode, and
  an electronic open-and closed-loop control unit, in particular for controlling the pressure and volume setting device, the isolating valves, the connection valves and the simulator enable valve.

BACKGROUND OF THE INVENTION

A brake system for motor vehicles is known from DE 10 2010 040 097 A1, which is incorporated by reference. The previously known brake system is designed as an "open system", in which an excess of pressure medium arising during wheel brake pressure modulation processes is passed to the pressure medium reservoir via a hydraulic return line. The disadvantage with open brake systems is that, if there is a leak in an outlet valve, the brake circuit concerned fails. Another disadvantage of the known arrangement is that, owing to this risk of failure, it is only possible to use seat valves acted upon in the closing direction by the wheel brake pressures as outlet valves. As a result, only digitally controlled seat valves can be used as outlet valves, and it is not possible to achieve infinitely variable, comfortable and quiet pressure control with these valves. Analog-controlled, wheel-specific pressure reduction is not possible with the outlet valves of the known arrangement because operation of a seat valve under analog control presupposes the opposite direction of flow. The same argument also excludes use of the inlet valves for wheel-specific pressure reduction control in the direction of the pressure medium supply device. Because these inlet valves capable of analog control in the pressure buildup direction cannot be controlled in the direction of flow for pressure reduction and would be "pulled shut", a check valve that opens in the direction of pressure reduction is connected in parallel with each inlet valve. Thus, in the known arrangement, the pressure medium supply device must always supply a pressure which is at least as high as the highest of the wheel brake pressures demanded. A pressure buildup carried out with the controllable pressure medium supply device is possible only for the wheel brake with the highest instantaneously demanded pressure, while the remaining, lower wheel pressures are derived from the maximum pressure via the inlet valves capable of analog control. However, this leads to wheel brake characteristics with a lower quality of control if the differences between the required wheel pressures and the maximum pressure are small. With predetermined setpoint wheel brake pressures, the pressure to be output by the pressure medium supply device is fixed with this pressure control concept. At the same time, it is not possible to exploit the fact that it is simpler to provide a precise pressure medium volume than a precise pressure with a pressure and volume setting device. While it is a simple matter to output and accurately meter a required volume by means of the pressure and volume setting device, a required pressure is established by a method in which the actual pressure output is detected by means of a pressure sensor and a system pressure controller calculates and implements the change in pressure medium volume required to bring the actual pressure closer to the setpoint pressure. When the method described is used for wheel brake pressure control in the known arrangement, acceptable quality of control is difficult to achieve.

SUMMARY OF THE INVENTION

An aspect of the present invention is a method for operating a brake system of the type stated which allows an improvement in the quality of control of the braking processes, especially during control processes which require wheel brake pressures that differ from wheel to wheel.

The concept underlying the invention is that, to set wheel-specific brake pressures, the inlet and outlet valves are controlled in an analog manner by being supplied with different electric currents.

BRIEF DESCRIPTION OF THE DRAWINGS

Advantageous developments of the method according to the invention will become apparent from the dependent claims and the following description with reference to schematic figures, of which:

DETAILED DESCRIPTION OF THE INVENTION

Figure 1:
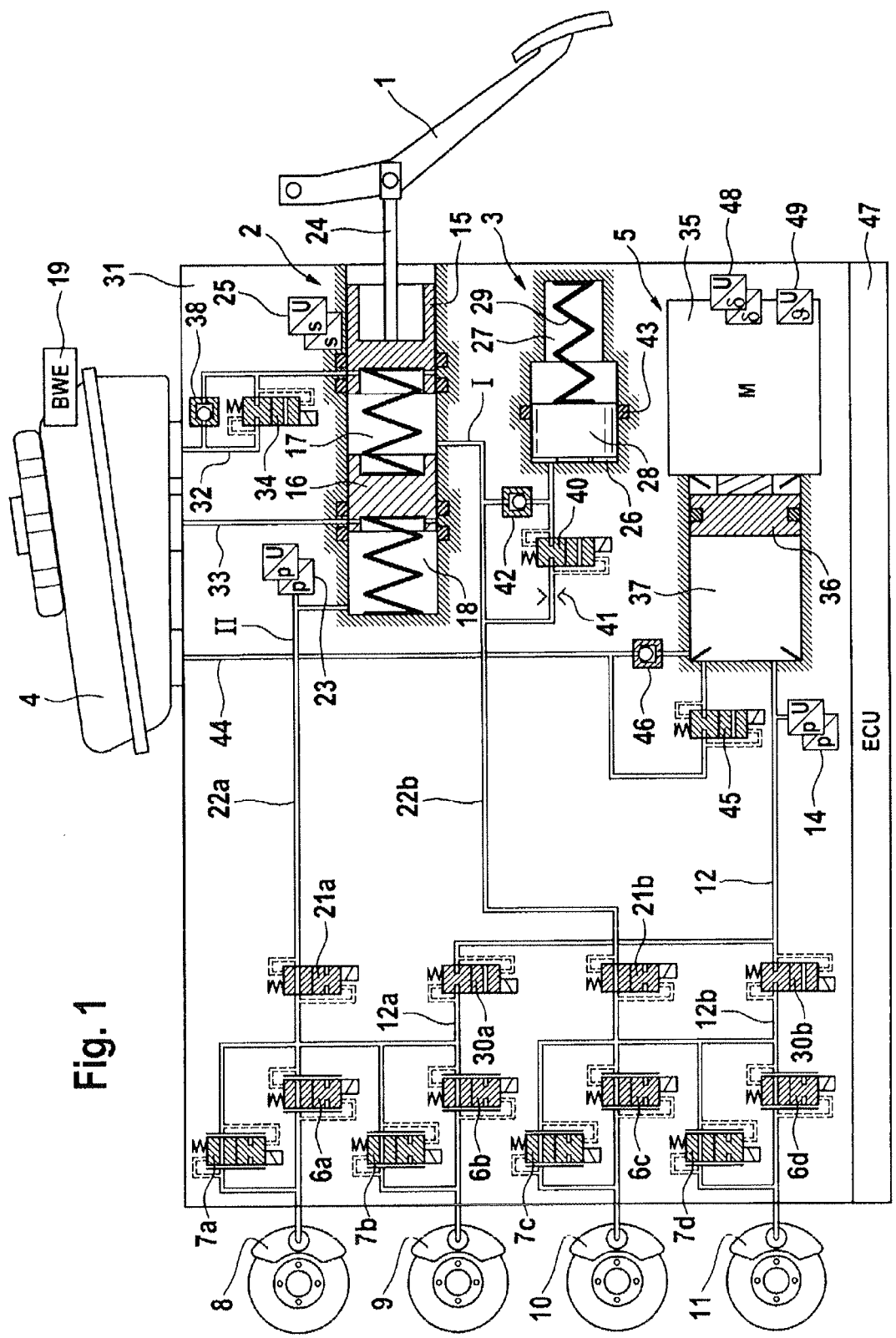
FIG. 1 shows a first illustrative embodiment of a brake system for carrying out a method according to the invention.

FIG. 1 shows a hydraulic circuit diagram of a brake system suitable for carrying out a method according to an aspect of the invention. The brake system illustrated consists essentially of a hydraulic actuating unit 2, which can be actuated by means of an actuating or brake pedal 1, a travel simulator 3, which interacts with the hydraulic actuating unit 2, a pressure medium reservoir 4, which is associated with the hydraulic actuating unit 2 and has an electric filling level warning device 19, an electrically controllable pressure and volume setting device 5, electrically controllable pressure modulation or inlet and outlet valves 6a-6d, 7a-7d, which are connected together hydraulically in pairs via center ports and are connected to the wheel brakes 8, 9, 10, 11 of a motor vehicle (not shown). The inlet ports of the inlet valves 6a-6d are supplied by means of system pressure lines 12a, 12b with a pressure which is designated as the system pressure. All the electrically actuable components are controlled by an electronic open-and closed-loop control unit 47.

The abovementioned components 6a-6d, 7a-7d, 12a, 12b can be combined to form an electrohydraulic module and thus form a pressure modulation unit (not designated specifically).

As is furthermore shown in the drawing, the hydraulic actuating unit 2 of the brake system given by way of example has, in an electrohydraulic open-and closed-loop control unit 31, two hydraulic pistons 15, 16, arranged in series, which delimit hydraulic chambers or pressure spaces 17, 18 which, together with the pistons 15, 16, form a dual-circuit brake master cylinder or tandem brake master cylinder. The pressure spaces 17, 18 are connected, on the one hand, to the pressure medium reservoir 4 via radial bores formed in the pistons 15, 16 and via corresponding pressure compensating lines 32, 33, wherein said bores and lines can be shut off by a movement of the pistons 15, 16 relative to the electrohydraulic open-and closed-loop control unit 31, and, on the other hand, by means of hydraulic lines 22a (brake circuit II), 22b (brake circuit I) to system pressure lines 12a, 12b, via which the pressure modulation valves 6a-6d; 7a-7d are connected to the actuating unit 2. In this case, a diagnostic valve 34 which is open when deenergized is connected in parallel in the pressure compensating line 32 with a check valve 38 that closes toward the pressure medium reservoir 4. The brake master cylinder pressure spaces 17, 18 are connected to the hydraulic system pressure lines 12a, 12b via the hydraulic lines 22a, 22b and respective isolating valves 21a, 21b, which are designed as electrically actuable 2/2-way valves, which are preferably open when deenergized. A pressure sensor 23 connected to pressure space 18 detects the pressure built up in pressure space 18 through the displacement of the second piston 16. The pressure spaces 17, 18 furthermore accommodate return springs (not designated specifically), which position the pistons 15, 16 in an initial position when the brake master cylinder is unactuated. A piston rod 24 couples the pivoting movement of the brake pedal 1 due to a pedal actuation to the translational movement of the first (master cylinder) piston 15, the actuating travel of which is detected by a travel sensor 25, preferably embodied in a redundant manner. As a result, the corresponding piston travel signal is a measure of the brake pedal actuation angle. It represents a braking demand by a vehicle driver.

It can furthermore be seen from the graphical representation of the brake system according to the invention that the abovementioned travel simulator 3 is of hydraulic design and consists essentially of a simulator chamber 26, a simulator spring chamber 27 accommodating a simulator spring 29, and a simulator piston 28 separating the two chambers 26, 27 from one another. In this case, the simulator chamber 26 can be connected to the first pressure space 17 of the tandem master cylinder 2 by activating a simulator enable valve 40, which is closed when deenergized. Arranged antiparallel to the simulator enable valve 40 is a check valve 42, which allows a largely unhindered return flow of the pressure medium from the simulator chamber 26 to brake master cylinder pressure space 17, independently of the operating state of the simulator enable valve 40. A hydraulic orifice, provided with reference sign 41, is arranged ahead of the simulator enable valve 40 in the direction of flow from brake master cylinder pressure space 17 to the simulator chamber 26. A sealing ring 43 (indicated only schematically) is used to seal off the simulator piston 28.

As can furthermore be seen from FIG. 1 of the drawing, the electrically controllable pressure and volume setting device 5 mentioned at the outset is designed, by way of example, as a hydraulic cylinder-piston arrangement or a single-circuit electrohydraulic actuator, the piston 36 of which can be actuated by a schematically indicated electric motor 35 via a rotary/translational mechanism (not shown) and which delimits a pressure space 37.

Figure 2:
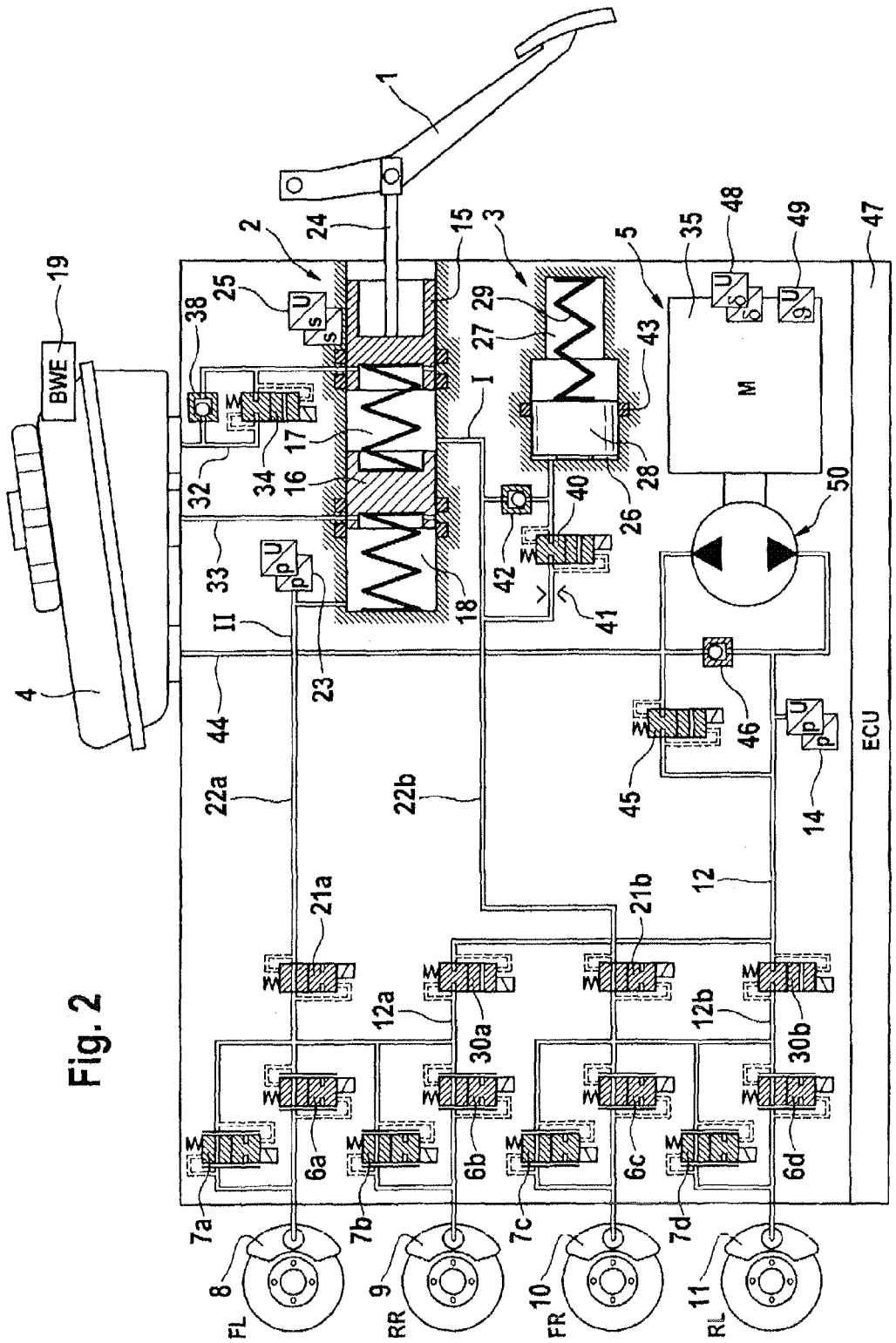
FIG. 2 shows a second illustrative embodiments of a brake system for carrying out a method according to the invention.

FIG. 2 illustrates the fact that the electrically controllable pressure and volume setting device 5 can also be formed by a pump 50 driven by an electric motor. Whereas the variant of the pressure and volume setting device 5 illustrated in FIG. 1 holds ready the pressure medium internally and puts it under pressure and outputs it when required, the pump variant illustrated in FIG. 2 draws in the respectively required quantity of pressure medium from the pressure medium reservoir 4 in order to put it under pressure and output it. The volume of the piston variant illustrated in FIG. 1 can be exhausted. When the piston 36 has displaced the pressure medium from pressure space 37, it is only possible to pressurize and output further pressure medium after interrupting the pressure and volume output and returning the piston 36 in order to draw in more pressure medium from the reservoir 4. In contrast, the pump variant illustrated in FIG. 2 is inexhaustible if the brake system is intact because more pressure medium is held in the pressure medium reservoir 4 than can be absorbed by putting the pressurizable hydraulic components under pressure.

In order to allow suitable control of the electric current fed to the electric motor 35, sensors that detect the characteristic operating variables of the electric motor 35, in particular current sensors for the phase currents thereof, are provided in both illustrative embodiments. As a further example, a rotor position sensor (indicated only schematically) serving to detect the rotor position of the electric motor 35 is designated by the reference sign 48. In addition, a temperature sensor 49 can also be used to detect the temperature of the motor winding.

Connected to the pressure and volume setting device 5 is a system pressure line 12, which connects said device to electrically actuable connection valves 30a, 30b. By actuating the first electrically actuable connection valve 30a, the system pressure line 12 can be connected to circuit pressure line 12a and, by actuating a second, likewise electrically actuable, connection valve 30b, can be connected to circuit pressure line 12b. Pressure medium is supplied from the pressure medium reservoir 4 to the pressure and volume setting device 5 via a pressure medium feed line 44, which is represented as a more thickly drawn hydraulic connection in FIG. 1 and FIG. 2 in accordance with the large flow cross section selected for it in order to minimize intake resistances.

In FIG. 1, a check valve 46 that closes toward the pressure medium reservoir 4 is inserted into the pressure medium feed line 44, said check valve allowing the additional intake of pressure medium mentioned into pressure space 37, whereas, in FIG. 2, the pressure medium feed line 44 is connected directly to the pump 50, and check valve 46 is inserted between pressure medium line 44 and system pressure line 12, thus avoiding a possible vacuum in the system pressure line 12 in the case of reverse delivery by pump 50, i.e. delivery from the system pressure line 12 to the pressure medium feed line 44. An electromagnetically actuable 2/2-way valve 45, which is inserted between system pressure line 12 and pressure medium feed line 44 and is closed when deenergized, allows a valve-controlled system pressure reduction to the pressure medium reservoir 4 when required.

A preferred method for operating the brake systems described is disclosed in the following patent claims and the following description. Moreover, numerous modifications can be proposed in the case of the present invention without exceeding the scope of the invention.

By way of example, the inlet and outlet valves 6a-6d, 7a-7d are controlled in an analog manner to set wheel-specific brake pressures by being supplied with different electric currents in order to allocate a pressure medium volume flow made available by the pressure and volume setting device 5 to the wheel brakes 8-11 having a requirement for a change in pressure.

The electrically controllable pressure and volume setting device is used to displace pressure medium volumes which are proportioned according to the desired changes in wheel brake pressure and, by means of the different control currents of the brake pressure modulation valves 6a-6d, 7a-7d, are'passed to the selected wheel brakes as an inlet flow or out of the wheel brakes selected for a pressure reduction as a volume discharge flow.

To increase the pressure in a selected wheel brake, the control currents for the pressure buildup or inlet valves of the other wheel brakes are increased relative to the selected wheel brake, and a pressure medium volume is displaced into the selected wheel brake by means of the controllable pressure and volume setting device 5.

When a simultaneous pressure buildup is required in several wheel brakes, the control currents of the brake pressure buildup or inlet valves of the remaining wheel brakes are increased, and a pressure medium volume is displaced into the selected wheel brakes by means of the electrically controllable pressure and volume setting device 5, in order to increase the pressure in the selected wheel brakes.

It is advantageous if the control currents of the inlet valves of the selected wheel brakes are reduced cyclically in relation to one another during pressure buildup, with the result that the duration of current reduction defines the share of the selected wheel brake in the pressure buildup volume.

To reduce the pressure in a selected wheel brake, the control currents for the pressure reduction or outlet valves of the other wheel brakes are increased relative to the selected wheel brake, and a pressure medium volume is removed from the selected wheel brake by means of the electrically controllable pressure and volume setting device 5.

When a simultaneous pressure reduction is required in several wheel brakes, the control currents of the brake pressure reduction or outlet valves of the selected wheel brakes are reduced, and an appropriately proportioned pressure medium volume is removed from the selected wheel brakes by means of the electrically controllable pressure and volume setting device, in order to reduce the pressure in the selected wheel brakes.

The control currents of the outlet valves of the selected wheel brakes are preferably reduced cyclically in relation to one another during pressure reduction, with the result that the duration of current reduction defines the share of the selected wheel brake in the pressure reduction volume.

It is preferable if at least some of the reduction volume flow on the part of the pressure and volume setting device is provided by opening the solenoid valve 45.

The remaining details of the operation of the brake system according to the invention both in the preferred "brake-by-wire" operating mode and in the "fall-back" operating mode will be apparent to a person skilled in the relevant technical area from the disclosure of the present patent application and therefore need not be explained more specifically.

The invention claimed is:

1. A method for operating a brake system for motor vehicles, which can be controlled in a "brake-by-wire" operating mode both by the vehicle driver and also independently of the vehicle driver, is preferably operated in the "brake-by-wire" operating mode, and can be operated in at least one fall-back operating mode, with hydraulic wheel brakes
a brake master cylinder having at least one pressure space, with the pressure in which at least the wheel brakes of a front axle of the motor vehicle can be supplied in the fall-back operating mode,
a pressure medium reservoir,
a brake pedal for actuating the brake master cylinder,
brake circuits, which have brake master cylinder and wheel brake pressure spaces, hydraulic connections and electrohydraulic control elements,
an electrically actuable isolating valve for each brake circuit for dividing the brake circuit into a brake circuit section which can be subjected to pressure by the vehicle driver and a brake circuit section which can be subjected to pressure "by wire",
an electrically actuable inlet valve and an electrically actuable outlet valve for each wheel brake for setting wheel-specific brake pressures, an outlet side of each outlet valve being connected without an intervening valve to an inlet side of a respective one of the inlet valves,
an electrically controllable pressure and volume setting device,
an electrically actuable connection valve, which is closed when deenergized, for each brake circuit for hydraulic connection of the electrically controllable pressure and volume setting device to the brake circuit section which can be subjected to pressure "by wire",
a simulation device, which can be connected hydraulically to at least one pressure space of the brake master cylinder and can be activated by means of an electrically or mechanically actuable simulator enable valve, having a preset characteristic, and which gives the vehicle driver a pleasant brake pedal feel in the "brake-by-wire" operating mode, and
an electronic open- and closed-loop control unit, for controlling the pressure and volume setting device, the isolating valves, the connection valves, the simulator enable valve and the inlet and outlet valves,
wherein, to set wheel-specific brake pressures, the inlet and outlet valves are controlled in an analog manner by being supplied with different electric currents in order to allocate a pressure medium volume flow made available by the pressure and volume setting device to the wheel brakes having a requirement for a change in pressure.

2. The method as claimed in claim 1, wherein the electrically controllable pressure and volume setting device is used to displace pressure medium volumes which are proportioned according to the desired changes in wheel brake pressure and, by the different control currents of the brake pressure modulation valves, are passed to the selected wheel brakes as an inlet flow or out of the wheel brakes selected for a pressure reduction as a volume discharge flow.

3. The method as claimed in claim 2, wherein, when a simultaneous pressure buildup is required in several wheel brakes, the control currents of the brake pressure buildup or inlet valves of the remaining wheel brakes are increased, and a pressure medium volume is displaced into the selected wheel brakes by means of the electrically controllable pressure and volume setting device, in order to increase the pressure in the selected wheel brakes.

4. The method as claimed in claim 3, wherein the control currents of the inlet valves of the selected wheel brakes are reduced cyclically in relation to one another during pressure buildup, with the result that the duration of current reduction defines the share of the selected wheel brake in the pressure buildup volume.

5. The method as claimed in claim 2, wherein, when a simultaneous pressure reduction is required in several wheel brakes, the control currents of the brake pressure reduction or outlet valves of selected wheel brakes are reduced, and an appropriately proportioned pressure medium volume is removed from the selected wheel brakes by means of the electrically controllable pressure and volume setting device, in order to reduce the pressure in the selected wheel brakes.

6. The method as claimed in claim 5, wherein the control currents of the outlet valves of the selected wheel brakes are reduced cyclically in relation to one another during pressure reduction, with the result that the duration of current reduction defines the share of the selected wheel brake in the pressure reduction volume.

7. The method as claimed in claim 6, wherein at least some of the reduction volume flow on the part of the pressure and volume setting device is provided by opening a solenoid valve.

8. The method as claimed in claim 5, wherein at least some of the reduction volume flow on the part of the pressure and volume setting device is provided by opening a solenoid valve.

9. The method as claimed in claim 1, wherein, to increase the pressure in a selected wheel brake, the control currents for the pressure buildup or inlet valves of the other wheel brakes are increased relative to the selected wheel brake, and a pressure medium volume is displaced into the selected wheel brake by means of the controllable pressure and volume setting device.

10. The method as claimed in claim 1, wherein, to reduce the pressure in a selected wheel brake, the control currents for the pressure reduction or outlet valves of the other wheel brakes are increased relative to the selected wheel brake, and a pressure medium volume is removed from the selected wheel brake by means of the electrically controllable pressure and volume setting device.

11. The method as claimed in claim 10, wherein at least some of the reduction volume flow on the part of the pressure and volume setting device is provided by opening a solenoid valve.

12. The method according to claim 1, wherein all the wheel brakes can be supplied in the fall-back operating mode.

13. A brake system for carrying out the method as claimed in claim 1, wherein the wheel brake pressure modulation valves or inlet and outlet valves for each wheel are designed as 2/2-way valves which can be subjected to analog control and are open when deenergized.

14. The brake system as claimed in claim 13, wherein ports of the outlet valves which face away from the wheel brakes are connected in circuits with ports of the inlet valves which face away from the wheel brakes.

15. The brake system as claimed in claim 14, wherein the installation orientation of the outlet valves is chosen in such a way that they are acted upon in the opening direction by the wheel brake pressures.

16. The brake system as claimed in claim 13, wherein the installation orientation of the outlet valves is chosen in such a way that they are acted upon in the opening direction by the wheel brake pressures.

17. The brake system as claimed in claim 13, wherein the installation orientation of the inlet valves is chosen in such a way that they are acted upon in the closing direction by the wheel brake pressures.

18. The brake system as claimed in claim 13, wherein an electromagnetically actuable 2/2-way valve which is inserted between the system pressure line and the pressure medium feed line and is closed when deenergized as part of the pressure and volume setting device is provided.

19. The brake system as claimed in claim 18, wherein, during pressure and volume reduction processes, a pressure medium volume flow is passed from the system pressure line to the pressure medium feed line via the electromagnetically actuable valve.

* * * * *